United States Patent [19]
Jennings et al.

[11] 3,915,763
[45] Oct. 28, 1975

[54] METHOD FOR HEAT-TREATING LARGE DIAMETER STEEL PIPE

[75] Inventors: Reuel E. Jennings, Warren; Louis J. Moliterno, Girard; Clifford L. Amend, Youngstown, all of Ohio

[73] Assignee: Ajax Magnethermic Corporation, Warren, Ohio

[22] Filed: Jan. 14, 1974

[21] Appl. No.: 433,050

Related U.S. Application Data

[62] Division of Ser. No. 178,737, Sept. 8, 1971, Pat. No. 3,804,390.

[52] U.S. Cl. ............... 148/127; 148/131; 148/143; 148/144; 148/145; 148/150; 148/153
[51] Int. Cl.²............................................ C21D 9/14
[58] Field of Search .......... 148/150, 153, 154, 143, 148/131, 127, 144, 145

[56] References Cited
UNITED STATES PATENTS
1,959,344  5/1934  Coberly .............................. 148/143
3,294,599  12/1966  Huseby .............................. 148/143

*Primary Examiner*—R. Dean

[57] ABSTRACT

There is disclosed herein a method for inductively heat-treating large diameter steel pipe. The method comprises the exertion of radial restraint on relatively cold portions of the said pipe, progressively moving the pipe to a position where it is heated and quenched, the radial restraint exerted on the pipe being transmitted to pipe portions being heated and quenched, maintaining the roundness of the pipe during heating and quenching. The method also relates to preheating the weld bead portion of welded line pipe whereby overall uniform inductive heating of the pipe is attained.

8 Claims, 11 Drawing Figures

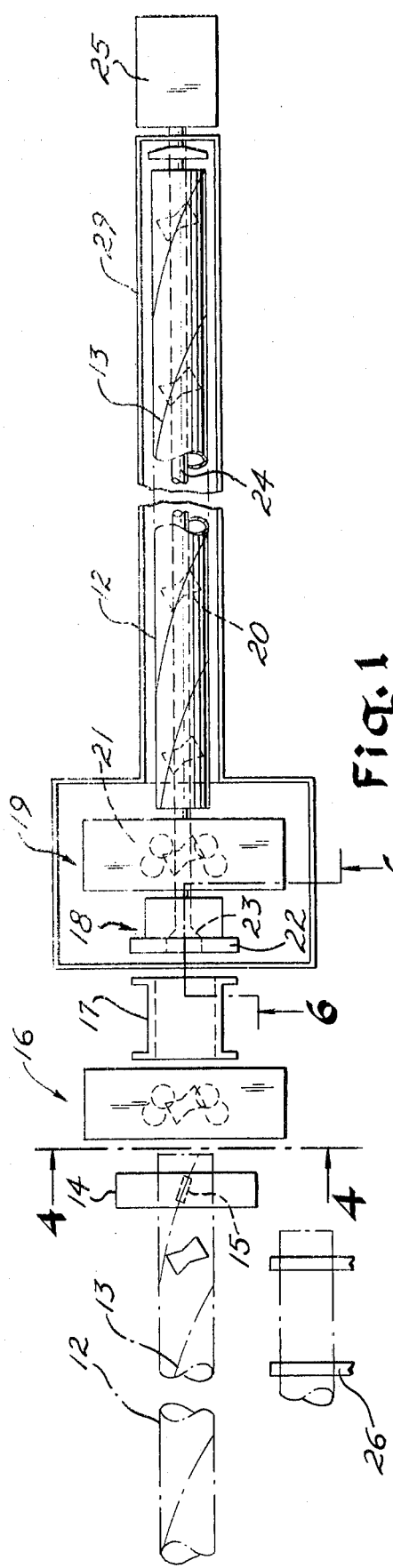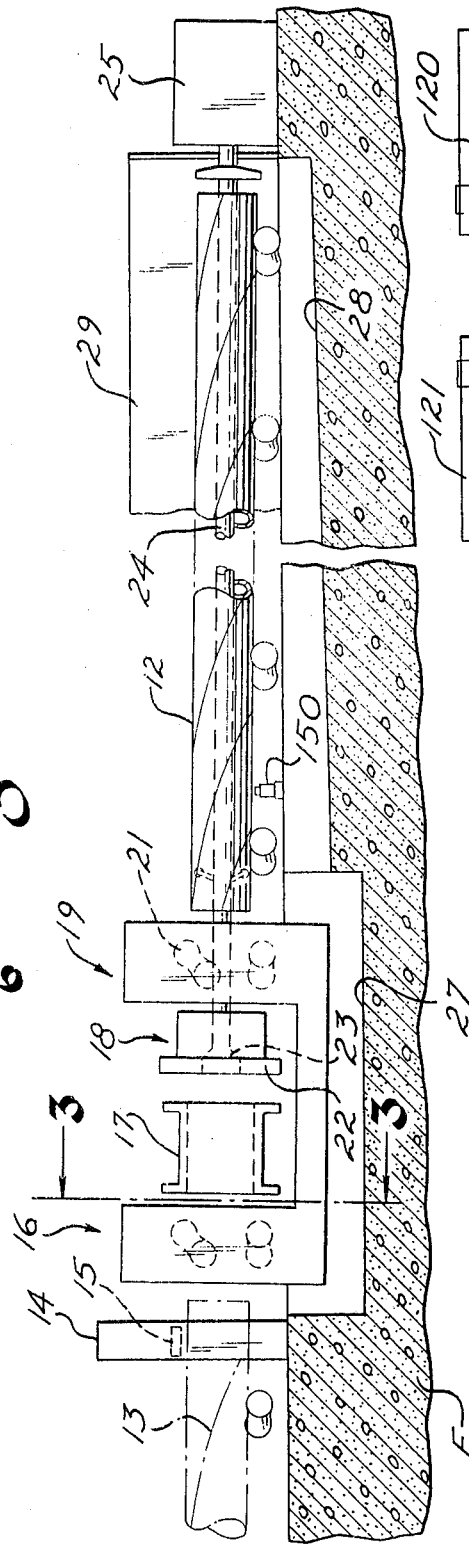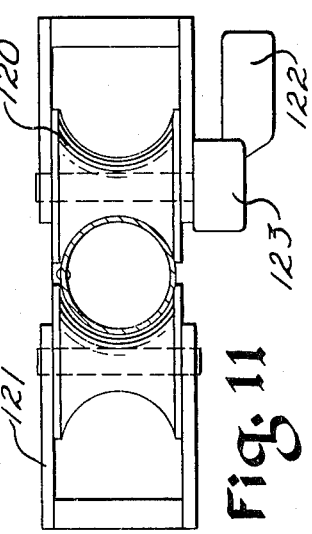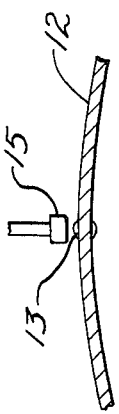

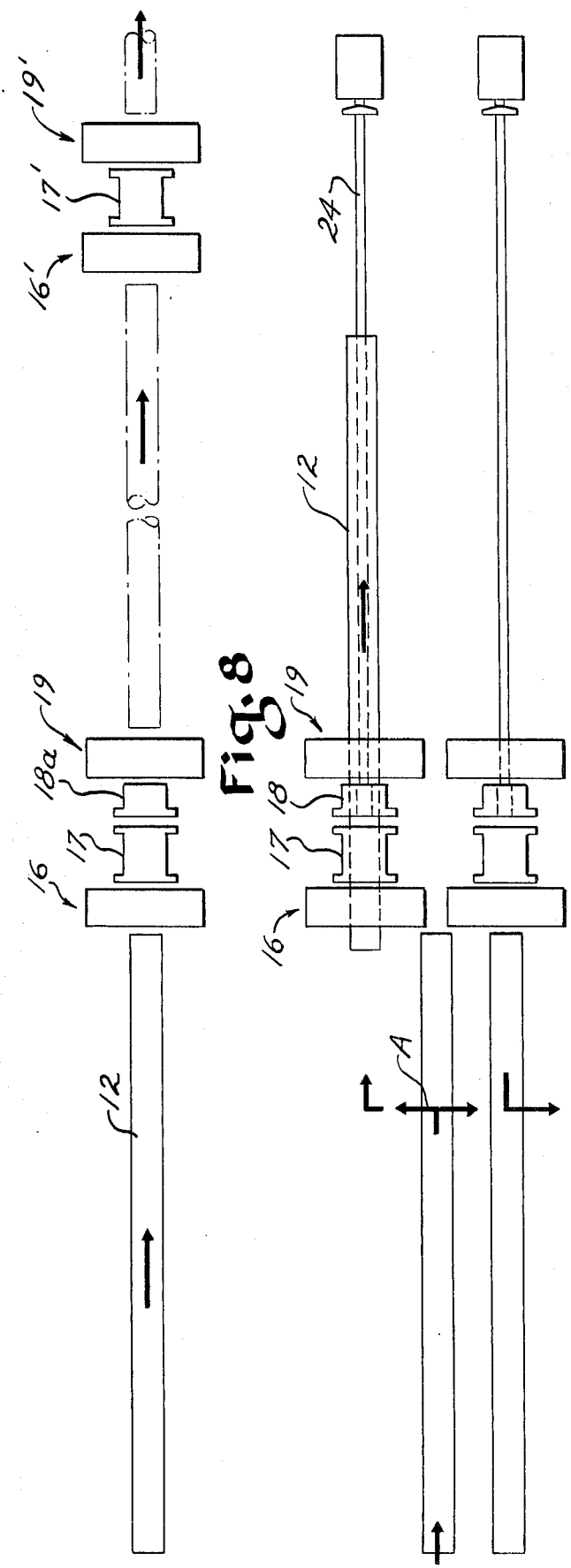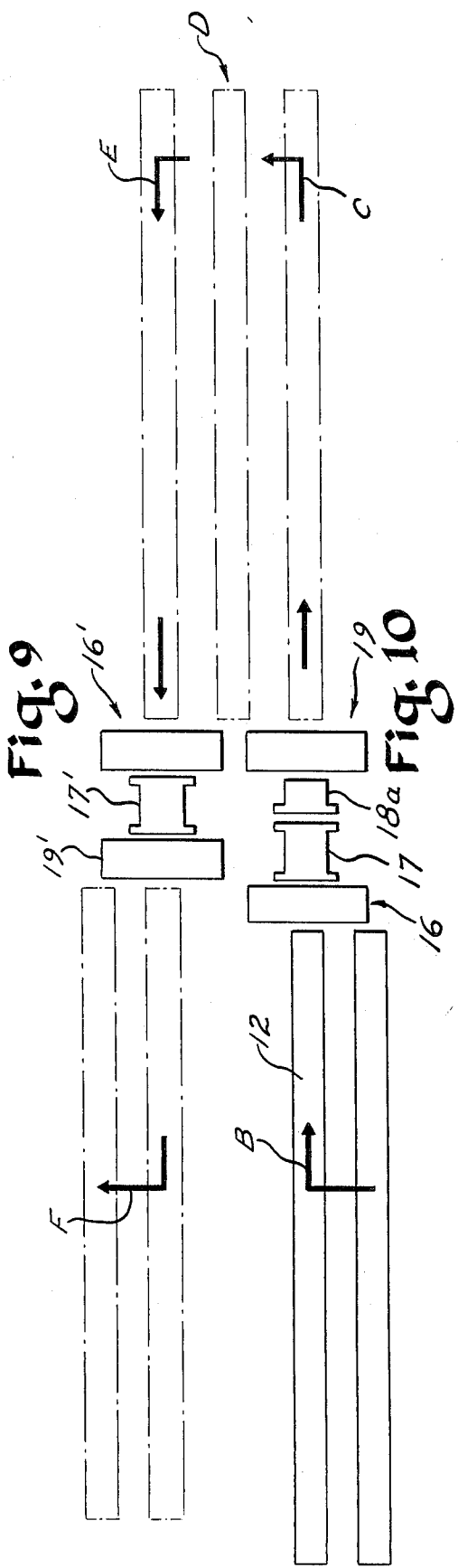

METHOD FOR HEAT-TREATING LARGE DIAMETER STEEL PIPE

This is a divisional of application for U.S. Pat. Ser. No. 178,737 filed Sept. 8, 1971, issued as U.S. Pat. No. 3,804,390.

This invention relates to the heat-treating of large diameter steel pipe especially used for oil and gas transmission lines and commonly produced by the UO process or by spiral welding mills and relates more particularly to a method for hardening said pipe and maintaining or improving the roundness thereof.

At present need exists for higher strength line pipe. This pipe can be produced by alloy, by precipitation hardening means, by fabrication from high strength plate, which may have been quenched and tempered, and by quenching and tempering the fabricated pipe. This latter means offers many advantages since it does not require high cost alloys or special pipe making facilities.

The invention discloses a method for heat-treating pipe without the necessity of cold expansion for pre-rounding and sizing of the pipe prior to heat-treatment. In the invention the pipe is held in radial restraint throughout the hardening and tempering cycles and the desired roundness is maintained or improved by the said restraint.

Large steel pipe in the range of 24 to 100 inches or more in diameter having a wall thickness near ¼ to 1 inch or more will not normally hold its roundness at quenching temperature, particularly when the heated part constitutes a substantial unsupported span. The method of this invention solves this problem by providing radial support for the pipe and transmitting stiffness throughout the contained span of pipe subjected to a relatively short heat and quench cycle.

It is a primary object of this invention to provide an improved method for hardening large diameter steel pipe.

Another object of the invention is to provide a method for hardening welded line pipe wherein the bead area is preheated with a measured quantity of heat so that the uniform radial heating by the induction heating coil will result in a final uniform temperature throughout the wall of the pipe and the bead.

Still another object of the invention is to provide a method for hardening relatively thin-walled, large diameter pipe wherein the pipe is adequately supported and the shape thereof maintained during heating.

Yet another object is to provide a method as set forth above wherein continuous portions or zones of the pipe are quickly raised to quenching temperature and thereafter rapidly cooled to develop a desired hardness as the pipe is moved in the direction of its axis.

Another object of this invention is to provide a method as set forth above designed to heat either UO fabricated straight bead or spiral welded pipe.

A still further object of the invention is to provide an improved method of the type referred to which is compatible to the different manufacturing requirements of various pipe producers while retaining full advantage of the method referred to above.

Another object of the invention is to provide an improved method of the type referred to wherein a constant speed and a constant thermal cycle for the pipe is maintained.

Another object of the invention is to provide an improved method of the type referred to wherein the volume of effective coolant during quenching is distributed uniformly both internally and externally around the diameter of the pipe.

Another object of the invention is to provide an improved method of the type referred to wherein an improved quenching system of minimum practical length is achieved.

A further object of the invention is to provide an improved method of the type referred to wherein said pipe is uniformly heated in the shortest possible time while maintaining high electrical efficiency.

A still further object of the method of the invention is to achieve improved physical properties in the said pipe which are preferable for use in transmission lines.

Another object of the invention is to effect economies in the manufacture and use of such lines.

Still another object of the invention is to achieve a relatively higher production rate for large diameter pipe of the type referred to.

Other objects of the invention and a number of advantages thereof will be readily apparent from the following description of the invention as illustrated in the accompanying drawings in which:

FIG. 1 is a simplified top plan view of one form of the pipe hardening and tempering apparatus used in the method of the invention;

FIG. 2 is a side elevation of the apparatus of FIG. 1;

FIG. 3 is an enlarged fragmentary transverse section of a pipe seam showing the location of a seam preheating inductor;

FIGS. 8, 9, and 10 are semidiagrammatic top plan views of proposed modifications of arrangements of pipe hardening and tempering apparatus used in the method of this invention.

FIG. 11 is a sectional view of a seam welded pipe showing alternative means for restraining the pipe.

Figure 4:
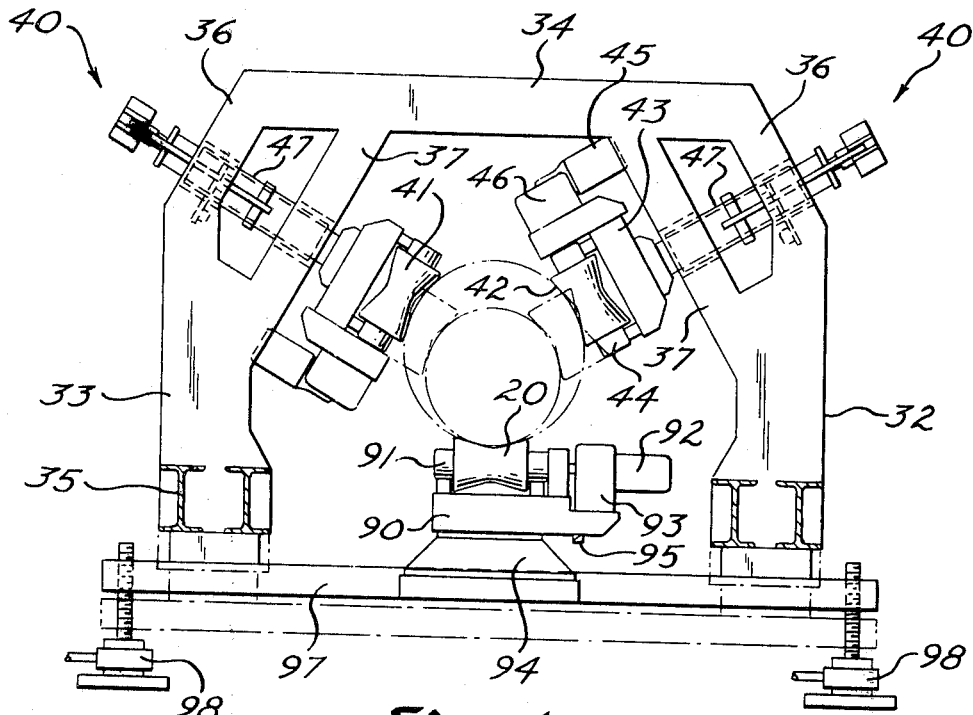
FIG. 4 is an elevation of a pipe restraining roll stand as seen from the line 4—4 of FIG. 1.

Referring now to the drawings in all of which like parts are designated by like reference numerals, FIGS. 1 and 2 illustrate a first form of the pipe hardening apparatus of this invention arranged in a line and adapted for the hardening of large diameter line pipe according to the method of this invention. As seen in the top plan view of FIG. 1, it is assumed that pipes to be hardened are initially moved endwise in the direction of the axis thereof at a predetermined speed and constant thermal cycle in from the left-hand end of the line and conveyed toward the right during which the same are heated to quenching temperature and then rapidly quenched to a desired hardness. The pipe then returns from right to left whereby it passes through the same heating coil, to be heated to a lower temperature for tempering, the fully hardened and tempered pipe preferably being then shifted laterally to outgoing receiving or conveying means.

Pipe moving in from the left-hand side of FIG. 1 is presumed to be relatively cold. In some installations, it may be desirable to use preheating apparatus whereby the temperature of the pipe is raised somewhat but remains well below the softening or yielding point of the metal. Thus, the incoming pipe, although it may be well above ambient temperature, is deemed to be relatively cold with respect to the desired hardening temperature.

The pipes to be heat-treated are indicated by the numeral 12 and are moved in the right-hand direction. It is assumed that the pipes 12 have already been formed and preferably submerged arc welded at the edges to afford a thickened, beaded seam 13 which extends longitudinally throughout the length of each pipe either in a generally straight line or in the form of a spiral. Prior expanding or rounding of the welded pipe is not necessary, because the heat-treating method of this invention is accomplished with apparatus which performs that function automatically as the pipe is treated. The pipe 12 first enters a frame 14 having mounted thereto an induction seam heater 15 disposed parallel with and closely adjacent to the seam 13 of the moving pipe as illustrated in FIGS. 1 and 3. It will be understood that the induction seam heater 15 is connected to a suitable electrical supply and control means whereby the same can be energized to preheat the bead area with a measured quantity of heat whereby subsequent uniform radial heating will result in a final uniform temperature throughout the wall of the pipe and the bead.

To the right of the induction seam heater 15 there are provided, in closely spaced relationship, a restraining roll stand 16, an induction heating coil 17, a circumferential spray quench 18, and a second restraining roll stand 19 which is substantially identical with the restraining roll stand 16. The pipes 12 are conveyed toward the right or left by reversible, variable speed, power driven bottom support rolls 20 which are provided at each restraining roll stand 16 and 19 and at spaced intervals in either axial direction therefrom. In addition, the restraining roll stands incorporate reversible, variable speed, power driven rolls 21 which exert radial inward pressure at spaced circumferential points and firmly hold the pipe closely adjacent to either side of the heating and quenching zone.

The spray quench 18 comprises an external quenching ring 22 and an internal quenching head 23. The quenching head 23 is connected to the distal end of an elongated tube 24, the opposite end of said tube being connected by any suitable means at its right-hand end to a pressurized liquid quench supply source or means indicated at 25.

In the form of the invention shown in FIGS. 1 and 2, the bottom support rolls 20 support the pipe 12 for conveyance from left to right at a slight downward angle or tilt of about 1 inch. A pipe 12 passes through the restraining roll stand 16 and into the induction heating coil 17 where the entire pipe is rapidly heated to quenching temperature. The portion of the pipe actually passing through the restraining roll stand 16 remains relatively cold whereby it retains its radial stiffness. The radial inward pressure of the adjustable rolls 21 in combination with one of the bottom support rolls 20 tend to correct any ovality of the pipe, holding the roundness thereof and transmitting the same to the heated portion of the pipe. Since large diameter pipe cannot hold its shape at quenching temperature over substantial unsupported distances, the pipe is caused to almost immediately enter the spray quench 18 at which point the outside of the pipe is quenched by a high volume spray from the external quenching ring 22 and the inside of the pipe is quenched by a high volume spray from the internal quenching head 23. The quenching liquid is caused to flow over and along the internal and external surfaces of the pipe uniformly whereby the pipe is cooled throughout the circumference thereof at a uniform rate to prevent any distortion of the pipe at this point. The means for affording this uniform quenching and cooling will be thoroughly discussed in connection with a detailed description of the spary quench 18. It will be understood that the external quench alone will provide sufficient cooling means for certain thinwalled pipes whereas both internal and external quenching may be desired with pipe having thicker walls and for various types of alloys. Generally, internal quenching is used with the external quenching when the wall thickness is five-eighths inch or greater or where the metal comprises alloys with carbon or carbon equivalents of less than 0.22 percent.

The heated and quenched pipe is immediately engaged by the restraining roll stand 19 which, in cooperation with the restraining roll stand 16, maintain substantially the shape and roundness of the pipe throughout heating and quenching cycles and provides means for transmitting the restraint back to the unsupported area of the pipe whereby it will be retained in its circular shape. The slight tilt or slant of the conveyor means precludes backup of the quenching liquid in the heating areas and allows excess liquid from inside of the pipe to drain out prior to movement of the pipe back through the induction heating coil 17 where it is heated to a lower temperature for tempering (FIG. 1). In this first form of the invention, hardened and tempered pipe passes back through and outwardly of the restraining roll stand 16 in the left-hand direction and is then preferably shunted laterally to a ramp or conveyor means indicated at 26.

It will be noted in FIG. 2 that the spray quench 18 may be disposed over a quench liquid pit 27 built into the floor or foundation indicated by the letter F. The tube 24 which carriers the quenching head 23 can be disposed over an elongated channel 28 in the floor F, the bottom of which said channel slopes downwardly in the left-hand direction to cause quench liquid draining out of the pipe 12 to flow back to the quench liquid pit 27. The quench liquid pit 27 and the channel 28 as shown are preferably surrounded by an upstanding shield 29 for keeping the quench liquid confined to said pit and channel.

For the purpose of further explaining the method of this invention, it will be assumed that the pipes 12 are substantially 48 inches in diameter and made from suitable steel having a thickness of substantially one-half inch. The pipe used can be taken directly from the mill without the intervening operation of cold expansion for rounding and sizing the pipe. A pipe thus constructed moves under the induction seam heater 15, and the seam 13 is preheated to a temperature which will result in a final uniform temperature of the pipe and bead after the induction heating of the entire pipe. The pipe passes through the restraining roll stand 16 into the induction heating coil 17 where it is heated throughout the entire cross section thereof to quenching temperature of about 1750°F. The heated section of the pipe next passes into the spray quench 18 at which point the temperature of the pipe is rapidly dropped to accomplish the desired hardness just prior to entering the extreme right-hand restraining roll stand 19.

FIG. 4 shows the restraining roll stand 16 in detail. It will be understood that the restraining roll stand 19 is constructed in the same manner and functions in the same way as said roll stand 16 and that only one of said roll stands will, therefore, be described in detail.

As shown, the restraining roll stand 16 comprises an inverted U-shaped frame 32 having laterally spaced, generally vertical side supports 33 connected across the top by a horizontal beam 34. The vertical side supports 33 are disposed on either side of the line of movement of the pipes 12, and the lower end portions of said vertical side supports are connected to horizontal beams 35 which are disposed parallel with the line of pipe movement and connect the restraining roll stands 16 and 19 together.

The upper end portion of each vertical side support 33 is provided with an inwardly angled portion 36 and a parallel, inwardly spaced brace 37. The angled portions 36 and braces 37 provide means for mounting a pair of inwardly convergently angled, adjustable, powered roll mounts generally indicated at 40. Each adjustable roll mount 40 adjustably mounts a roll 41, said roll as herein illustrated having a V-shaped outer surface 42. Each said roll 41 is mounted upon a pivotable base 43 by means of bearings 44 mounted to said base. Also mounted on each base 43 is a reversible motor 45 connected through a gear reducer 46 to the associated roll 41 to rotate said roll 41 to rotate said roll. The adjustable roll mounts 40 are adapted to press the rolls 41 radially inwardly against the pipe with substantial pressure by suitable power means indicated at 47 to correct any ovality in the pipe and assure roundness. The said rolls 41 may be skewed with respect to the pipe 12 by means of the rotatable base 43.

All of the rolls 20 and 41 are rotatable about axes which are radial with respect to a pipe and perpendicular to the axis of said rolls. Thus, said driving rolls can be skewed in such manner as to not only drive the pipes in an axial direction but, when desired, also cause them to rotate. This is particularly important where the pipe seam is spiral in form and the pipe must be rotated to keep the seam in line with the induction seam heater.

Figure 5:
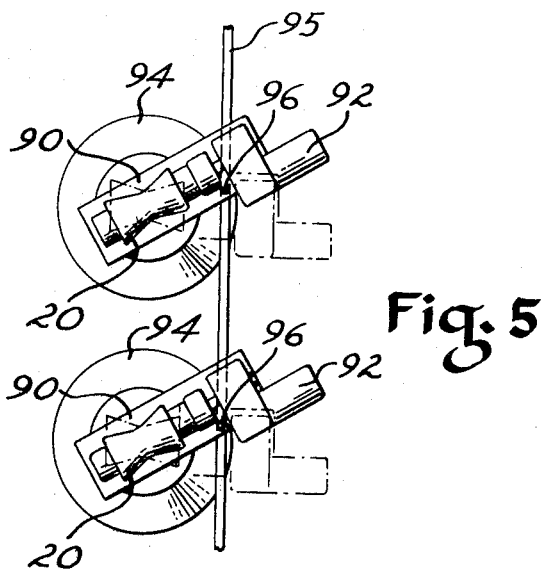
FIG. 5 is a top plan view of two bottom support roll mounts showing the manner in which they are uniformly adjustably skewed.

Means for pivoting the rolls 20 are disclosed in FIGS. 4 and 5. Each roll 20 is mounted upon a base 90 by means of bearings 91 and is rotatably driven by a reversible motor 92 through a gear reducer 93. The base 90 is freely pivotally mounted upon a support 94 which allows the base 90 to pivot but holds said base fixed against vertical movement with respect to the floor or foundation F upon which the entire heating line is built. As shown in FIG. 5, the bases 90 of all of the bottom support rolls 20 are pivotally connected to an elongated rod or arm 95 by pins 96 whereby longitudinal movement of the arm 95 will uniformly and simultaneously pivot all of the bases 90 thus skewing all of the rolls 20. Longitudinal movement of the rod 95 may be effected by any suitable manner such as a simple screwjack arrangement.

Referring again to FIG. 4, it will be noted that the inwardly converging center lines of the adjustable roll mounts 40 are disposed substantially 120° apart and that each adjustable roll mount is substantially 120° from the bottom support roll 20. To maintain the radial relationship of all of the rolls 20 and 41 regardless of the diameter of the pipe being heated, provision is made for vertically adjusting the entire frame 32 with respect to the floor or foundation F. As herein illustrated, the frame 32 is provided with a horizontal base 97 which is vertically movable by means of screwjacks 98 with respect to the floor or foundation F. Thus, the entire frame, and, therefore, the adjustable roll mounts 40 can be raised to accommodate larger pipe and lowered to accommodate relatively smaller pipe.

Referring now to the spray quench 18, as hereinbefore stated, the same comprises an external quenching ring 22 and an internal quenching head 23. This type of radial quenching presents a problem of centering of the pipe with respect to the quenching ring and quenching head. All of these members must be as nearly concentric as possible if the quenching liquid is to strike the surfaces of the pipe uniformly throughout the circumference thereof whereby the pipe is uniformly cooled throughout the entire cross section thereof. If the pipe or internal head are allowed to sag, the quenching liquid will not be uniformly projected upon the pipe and the result, in a moving pipe, will be nonlinear cooling and distortion of the pipe.

Figure 6:
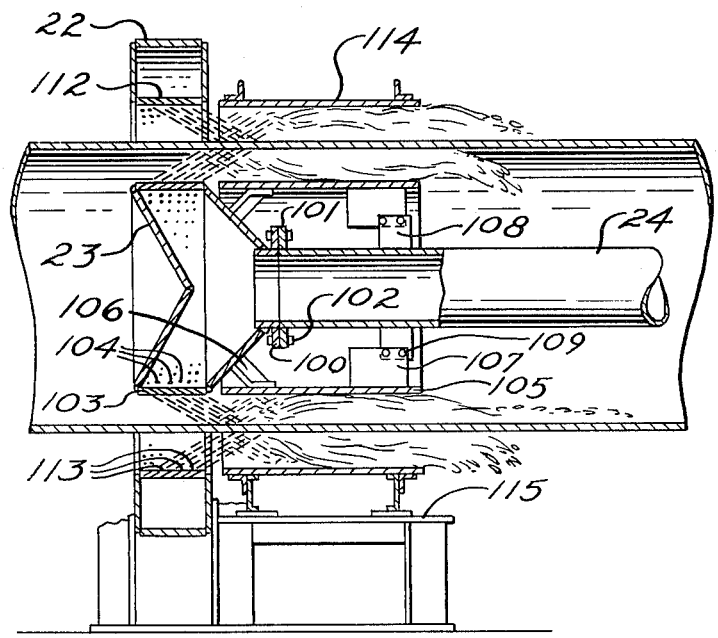
FIG. 6 is a sectional view of the quenching means of the apparatus taken along the axis thereof as indicated by the line 6—6 of FIG. 1.

Referring now particularly to FIG. 6, the quenching head 23 is a hollow, enlarged member which is preferably detachably connected to the tube 24 whereby heads of different diameters can be used with pipe of different diameters. Simple connection means are provided in the form of circumferential flanges 100 and 101 of the quenching head 23 and the tube 24, respectively, secured together by any suitable means such as nut and bolt assemblies 102. The quenching head 23 has an outer circumferential wall 103 provided with a multiplicity of jet openings 104. The jet openings 104 are adapted to emit a high volume spray in the right-hand direction away from the induction heating coil 17 and in the direction whereby the quenching liquid naturally drains into the channel 28 and quenching liquid pit 27. The quenching head 23 carries an inner activator tube 105 of substantially the same diameter as the outer wall 103 and of slightly smaller diameter than the pipe 12. The activator tube 105 projects toward the right and is secured to the head 23 in any suitable manner such as by means of braces 106 whereby the same is coaxial with said head. Further support is detachably given to the activator tube 105 by inwardly and outwardly projecting brackets 107 and 108 of the activator tube 105 and the elongated tube 24, respectively, connected together by nut and bolt assemblies 109.

The quenching ring 22 is of hollow, annular form having an inner circumferential wall 112 disposed concentric with the outer wall 103 of the head 23 and having a multiplicity of jet openings 113 adapted to spray the quenching liquid conically at an angle toward the right against the outer surface of the pipe in the direction of pipe movement. A cylindrical outer activator tube 114 of substantially the same diameter as the inner wall 112 is disposed to the right coaxially with the quenching ring 22 and concentric with the activator tube 105. The outer activator tube 114 is mounted in any suitable manner upon a base 115.

Figure 7:
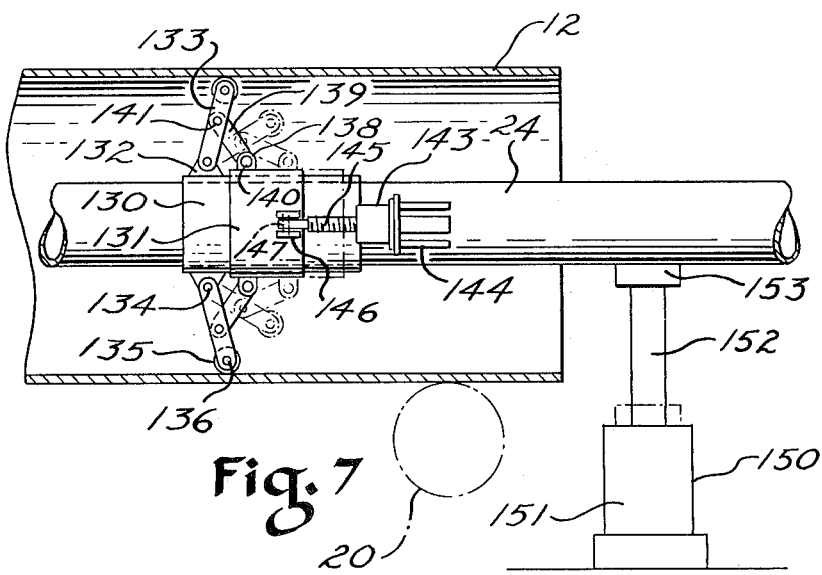
FIG. 7 is a side elevation of an apparatus for supporting an elongated supply tube of an internal quench.

FIG. 7 illustrates one way in which the spray head 23 and the elongated tube 24 are maintained concentric with a pipe during quenching. FIG. 7 shows a centering device 129 carried at any suitable spaced interval along the elongated tube 24, said centering means comprising a fixed sleeve 130 disposed around and secured in any suitable manner to the elongated tube 24. A movable sleeve 131 is slidably telescoped over the fixed sleeve 130 for reciprocating movement therealong in the axial direction. The fixed sleeve 130 is substantially longer in the axial direction than the movable sleeve 131 thereby affording substantial movement of said movable sleeve.

Adjacent to one end of the fixed sleeve 130 there are provided a plurality of radially outwardly projecting brackets 132 which are circumferentially spaced from each other and which are preferably at least three in number. Each bracket 132 has an arm 133 pivotally mounted thereto by means of a pin 134. The outermost end of each arm 133 is provided with a wheel or roller 135 pivotally mounted upon a short shaft 136. The arms 133 are of sufficient length whereby the rollers 135 can be pivoted outwardly into contact with the inner surface of a pipe 12 and maintained in substantial pressure contact therewith.

The movable sleeve 131 carries a plurality of radially outwardly projecting brackts 138 of the same number and circumferentially spaced in the same manner as the brackets 132. A link 139 is pivoted at one end thereof to each bracket 138 by means of a pin 140 and at the other end thereof to an intermediate point on the adjacent arm 133 by means of a pin 141.

Means for longitudinally reciprocating the movable sleeve 131 and holding said sleeve in any adjusted position are provided in the form of worm gear jacks 143 only one of which is illustrated, mounted upon the elongated tube 24 at a point beyond the fixed sleeve 130 by means of braces 144. Each worm gear jack has its axis disposed parallel with the axis of the elongated tube 24 whereby a screw shaft 145 thereof is effective longitudinally of said tube. The distal end of the screw shaft 145 is mounted between a pair of bracket means 146 carried by the movable sleeve 131 by means of a pin 147. There are preferably two worm gear jacks 143 which are mounted on diametrically opposite portions of the elongated tube 24 and remotely actuated by any conventional means to reciprocate the movable sleeve 131. When the movable sleeve 131 is moved to the left as shown in the drawings, the arms 133 will be moved outwardly by the links 139 whereby the wheels or rollers 135 will be brought to bear against the inner circumferential surface of the pipe 12. Movement of the movable sleeve 131 in the opposite direction will pivot the arm 133 inwardly as indicated by the dotted line showing in FIG. 7. It will be readily apparent that the arms 133 and wheels 135 can be adjusted to accommodate different size pipe and that the rollers can be withdrawn completely from the pipe surfaces when desired.

Support for the elongated quenching fluid supply tube 24, when a pipe 12 is not present, is provided by means of preferably a plurality of retractable supports or steady rests 150. Each said steady rest, as herein illustrated, has a body portion 151 and a vertically movable rod 152 surmounted by a support head 153. Said rod 152 may comprise the piston rod of a cylinder and piston motor, the screw shaft of a motorized screw jack, or other suitable device.

As shown in FIGS. 2 and 7, one steady rest 150 is positioned to the right of a support roll 20 which, in turn, is located to the right of a centering device 129 disposed adjacent to the exit side of the restraining roll stand 19. As a pipe 12 leaves the restraining roll stand 19, it is first engaged by a centering device 129 as the arms 133 thereof are moved outwardly as described. At this point, the steady rest 150 is in the extended, full-line position of FIG. 7 whereby it supports the tube 24. The pipe 12 next rides upon a bottom support roll 20 whereby the pipe is supported by said roll and the tube 24 is supported by the centering device 129. At this time the steady rest retracts to the broken-line position of FIG. 7 and full-line position of FIG. 2. Thus the weight of pipe moving out of the roll stand 19 is sequentially transferred from a plurality of steady rests 150 to a plurality of centering devices 129 and support rolls 20. Upon reverse movement of the pipe 12, the steady rests sequentially raise to support said pipe as said pipe moves off of the rolls 20 and away from the centering devices 129. Proper sequential actuation of said centering devices and steady rests is effected by simple known electrical control means, not herein illustrated.

From the foregoing it will be seen that the outer quenching ring 22, outer activator tube 114, inner quenching head 23, and inner activator tube 105 are effectively held concentric with a pipe 12 moving therethrough. Thus, the flow of quenching liquid is directed uniformly to the inner and outer surfaces of the pipe as desired and is held and caused to flow along the pipe surfaces in a uniform manner by the activator tubes. The combined effect of maintaining concentricity of the spray quench with the pipe, and the flow control by the activator tubes, is to achieve linear cooling and extend the effective axial length of the quenching of the pipe whereby the same is reduced in temperature with maximum rapidity.

FIG. 11 shows an alternative structure for restraining the pipe upon either side of the heating and quenching stations which is suitable particularly where the pipe has a straight seam. In this form, the pipe 12 is restrained between a pair of rolls 120 having annular concave outer surfaces shaped in cross section to fit the outer diameter of the pipe. The rolls are disposed on parallel axes and mounted in suitable cages 121 which are preferably biased toward the pipe by suitable means (not herein illustrated) such as that disclosed in connection with the adjustable roll mounts 40. Power means for driving at least one of the rolls is shown in the form of a reversible motor 122 and grear reducer 123. The rolls 120 are also suitable for restraining pipe on either side of a short, rapid heating and quenching area whereby relatively cold portions of the pipe are forced toward and held to greater roundness, such restraint and force being transmitted the short distance to the heated and less rigid portion of the pipe.

FIGS. 8, 9, and 10 show various arrangments for adapting the present invention to the continuous hardening of pipe. In FIG. 8, the pipes 12 are moved longitudinally of their axes in a straight continuous line through a restraining roll stand 16, an induction heating coil 17, a spray quench 18a adapted for external quenching only, and a second restraining roll stand 19, for restraining, heating, and quenching the pipe as hereinabove described. Instead of reversing the direction of the pipe as in the form of FIGS. 1 and 2, said pipe continues in the same direction where it passes through a restraining roll stand 16', an induction heating coil 17', and a second restraining roll stand 19' for tempering. The restraining roll stands are effective during the tempering of the pipe for mantaining roundness and transmitting the roundness to the heated portion of the pipe in the manner hereinabove described in connection with the first embodiment of the invention. Thus, whether the pipe returns through the coil 17 or progresses onwardly to a tempering coil 17', restraint is provided at both the hardening and tempering portions of the cycle.

FIG. 9 shows a form of the apparatus in which parallel, side-by-side hardening and tempering lines of the type shown in FIG. 1 are alternately fed from a single incoming supply line as indicated by the double headed arrow A. Where the tempering portion of the cycle is effected by moving the pipe backwardly through the coil 17 at an increased rate of speed, time saving overlapping cycles may be provided in this form of the invention as more clearly set forth in copending application Ser. No. 178,590 filed Sept. 8, 1971, now U.S. Pat. No. 3,775,010, dated Aug. 29, 1973.

The form of the invention as forth or shown in FIG. 10 is, in effect, a modification of the straight line showing of FIG. 8, this form routing the pipes 12 in a U-shaped pattern as shown by the arrows for first hardening and then tempering the pipe. Relatively cold pipes enter the system as indicated by the arrow B for transmission through a restraining roll stand 16, an induction heater coil 17, spray quench 18a, and restraining roll stand 19 in the right-hand direction for hardening the pipe as described. Each pipe is then transferred laterally as indicated by the arrow C to a center or drain station D where the pipe is emptied of the quenching fluid. Each pipe then is transferred to a second, parallel line as indicated by the arrow E whereby the pipe travels in the opposite direction parallel with the hardening line through a restraining roll stand 16', an induction heater coil 17', and a restraining roll stand 19' for tempering of the pipe. Each pipe is then transferred out of the system as indicated by the arrow F. It will be understood that the pipe can be readily tempered by reverse movement of the pipe through the same power coil used for hardening or by movement thereof through a separate power coil either at a reduced power level or at an increased speed or by any combination of the two factors which would provide the desired continuous tempering of the pipe.

The method of the present invention is particularly effective in the treating of large diameter steel pipe of the type adapted for oil and gas transmission over very long distances. The invention particularly solves the problem of excessive ovality of the pipe during heat treatment primarily due to the force of gravity when the pipe is heated in the horizontal position. This problem is particularly pronounced when heating very large diameter pipe with the pipe having a diameter to wall ratio of substantially 80 or more. In the present invention, the pipe is firmly clamped in relatively cold areas where substantial pressure can be applied to round or maintain the roundness of the pipe and transmit said roundness and radial restraint to the relatively hot portions of the pipe being heated either for hardening or tempering. Also, the induction heating is intensively applied over a short distance followed closely and quickly by quenching whereby the total unsupported span of heated pipe is kept to a minimum. Each roll stand grips the relatively cold pipe section immediately preceding and following the heated or the heated and quenched areas by firm radial restraint which is transmitted to the short section being heated or heated and quenched and prevents the pipe from going out of round in such areas. For pipe having greater wall thickness, means are provided for quenching both internally and externally; the external quench alone may be used with thin-walled pipe. Preheating of the thickened seam where a seam welded pipe is heat treated assures thorough and complete heating and uniform hardening of the entire pipe and seam bead.

It will be understood that many changes in the details of the invention as herein described and illustrated may be made without, however, departing from the spirit thereof or the scope of the appended claims.

We claim:

1. The method of hardening large diameter, relatively cold imperforate steel line pipe having a large diameter-to-wall ratio and being of such size that a substantial unsupported span thereof will not hold its shape at hardening temperature, the method comprising moving the pipe along a path in the direction of the axis thereof; rapidly heating the pipe to hardening temperature and immediately thereafter rapidly quenching the pipe, the heating and quenching zone extending over only a short axial dimension of the pipe; and applying radial restraint upon at least three points on the circumference of the pipe sufficient to maintain the shape of the pipe at relatively cold portions of the pipe on either side of and closely adjacent to the heating and quenching zone, the restrained, relatively cold portions of the pipe transmitting radial stiffness to the heating and quenching zone of the pipe and maintaining the shape thereof.

2. The method of hardening large diameter, relatively cold imperforate steel line pipe having a large diameter-to-wall ratio and being of such size that a substantial unsupported span thereof will not hold its shape at hardening temperature, the method comprising moving the pipe along a path in the direction of the axis thereof; rapidly inductively heating the pipe to hardening temperature and immediately thereafter spray quenching the pipe to rapidly reduce the temperature thereof, the heating and quenching zone extending over only a short axial dimension of the pipe; and applying radial restraint upon at least three points on the circumference of the pipe sufficient to maintain the shape of the pipe at relatively cold portions of the pipe on either side of and closely adjacent to the heating and quenching zone, the restrained, relatively cold portions of the pipe transmitting radial stiffness to the heating and quenching zone of the pipe and maintaining the shape thereof.

3. The method of claim 1 for hardening large diameter welded pipe having a thickened portion consistuting a continuous weld bead, the step of imparting a measured quantity of heat to the bead just prior to exertion of radial restraint on the pipe and prior to the pipe reaching the heating and quenching zone, the entire pipe and bead being subsequently uniformly heated temperature the desired temperaure at the heating zone.

4. The method of hardening large diameter seam welded line pipe having a weld bead, the pipe having a large diameter-to-wall ratio and being of such size that a substantial unsupported span thereof will not hold its shape at hardening temperature, the method comprising the step of moving the pipe in one axial direction at a predetermined speed; the step of imparting a measured quantity of heat to the weld bead of the pipe; the step of subsequently rapidly inductively heating the entire pipe cross section including the weld bead to hardening temperature and immediately thereafter spray quenching the pipe to rapidly reduce the temperature thereof, the last mentioned heating and quenching zone extending over only a short axial dimension of the pipe; and applying radial restraint upon at least three points on the circumference of the pipe sufficient to maintain the shape of the pipe at relatively cold portions of the pipe on either side of and closely adjacent to the heating and quenching zone, the restrained, relatively cold portions of the pipe transmitting radial stiffness to the heating and quenching zone of the pipe and maintaining the shape thereof.

5. The method of claim 1 wherein the steel line pipe referred to has a diameter of at least 24 inches.

6. The method of claim 1 wherein the steel line pipe referred to has a diameter substantially in the range of 24 inches to 100 inches and a wall thickness substantially in the range of ¼ inch to 1 inch.

7. The method of claim 1 wherein the steel line pipe referred to has a diameter substantially in the range of 24 inches to 100 inches and a general diameter-to-wall ratio of at least 80.

8. The method of hardening large diameter, relatively cold imperforate steel line pipe having a diameter substantially in the range of 24 inches to 100 inches and a general diameter-to-wall ratio of at least 80 and which will not hold its shape over a substantial unsupported span thereof at hardening temperature, the method comprising moving the pipe along a path in the direction of the axis thereof; rapidly inductively heating the pipe to hardening temperature and immediately thereafter rapidly spray quenching the pipe, the heating and quenching zone extending over only a short axial dimension of the pipe, there being radially stiff portions of the pipe below hardening temperature on either side of and closely adjacent to the zone; and applying radial restraint upon at least three points on the circumference of the pipe at said radially stiff portions sufficient to maintain the shape of the pipe at said radially stiff portions and transmitting radial stiffness to the part of the pipe which is at hardening temperature and maintaining the shape thereof.

* * * * *

UNITED STATES PATENT OFFICE
CERTIFICATE OF CORRECTION

PATENT NO. : 3,915,763
DATED : October 28, 1975
INVENTOR(S) : Reuel E. Jennings, et al It is certified that error appears in the above-identified patent and that said Letters Patent are hereby corrected as shown below:

Column 9, line 18, delete "No. 3,775,010" and substitute therefor --- No. 3,755, 010---.

Column 9, line 19, delete "as forth" and substitute therefor ---as set forth---.

Column 10, claim 3, line 58, delete "temperature the desired" and substitute therefor ---to the desired---.

Signed and Sealed this fourth Day of May 1976

[SEAL]

Attest:

RUTH C. MASON
Attesting Officer

C. MARSHALL DANN
Commissioner of Patents and Trademarks